(12) United States Patent
Sheppard (10) Patent No.: US 11,832,714 B1
(45) Date of Patent: Dec. 5, 2023

(54) CLEANING TOOL FOR STRING TRIMMERS (71) Applicant: John D Sheppard, Grapevine, TX (US)

(72) Inventor: John D Sheppard, Grapevine, TX (US)

(*) Notice: Subject to any disclaimer, the term of this patent is extended or adjusted under 35 U.S.C. 154(b) by 221 days.

(21) Appl. No.: 17/200,807

(22) Filed: Mar. 13, 2021

(51) Int. Cl.
| | |
|---|---|
| *A46B 13/02* | (2006.01) |
| *A47L 11/40* | (2006.01) |
| *A46B 7/04* | (2006.01) |
| *A46B 13/00* | (2006.01) |
| *A01D 42/06* | (2006.01) |
| *A47L 11/282* | (2006.01) |
| *A01D 101/00* | (2006.01) |
| *A01D 34/416* | (2006.01) |

(52) U.S. Cl.
CPC .............. *A46B 13/02* (2013.01); *A01D 42/06* (2013.01); *A46B 7/044* (2013.01); *A46B 13/001* (2013.01); *A47L 11/282* (2013.01); *A47L 11/4036* (2013.01); *A47L 11/4069* (2013.01); *A01D 34/416* (2013.01); *A01D 2101/00* (2013.01); *A46B 2200/3033* (2013.01)

(58) Field of Classification Search
CPC ......... A46B 13/001; A46B 13/02; A46B 7/04; A46B 7/044; A46B 7/046; A46B 7/048; A01D 34/412; A01D 34/416; A01D 34/4168; A01D 42/06; A47L 11/282; A47L 11/4036; A47L 11/4038; B60S 3/06; B60S 3/063
See application file for complete search history.

(56) References Cited

U.S. PATENT DOCUMENTS

| | | | |
|---|---|---|---|
| 440,114 A | * | 11/1890 | Pederson ............. A46B 13/001 |
| | | | 15/179 |
| 4,065,913 A | * | 1/1978 | Fisher ................ A01D 34/4166 |
| | | | 56/255 |
| 4,242,794 A | | 1/1981 | Peterson |
| | | | (Continued) |

FOREIGN PATENT DOCUMENTS

| | | | | |
|---|---|---|---|---|
| KR | 20140146504 A | * | 12/2014 | |
| WO | WO-2009140748 A1 | * | 11/2009 | ............. A01D 34/42 |

OTHER PUBLICATIONS

PE2E Translation of KR20140146504A; Yang, Dong; Dec. 26, 2014; p. 1-13 (Year: 2014).*

(Continued)

*Primary Examiner* — Laura C Guidotti
*Assistant Examiner* — Sidney D Hohl (57) ABSTRACT

Cleaning tools are mounted directly to rotary spindles of conventional string trimmers. The cleaning tools have brush channels which extend through one or more sides thereof, with each brush channel having an edge channel and a bristle channel. The edge channels are disposed interiorly within the body of respective ones of the bristle channels. Channel brush inserts are secured in respective ones of the brush channels, and each includes a mounting base and a bristle body. The mounting bases are inserted into respective ones of the edge channels and the bristle bodies extend from a respective one of the mounting bases through the bristle channels, from the one or more sides and exteriorly of the cleaning tool. One cleaning tool has three brush channels formed to extend into a laterally extending sidewall. In another cleaning tool the brush channels are formed to extend into the bottom end surface thereof.

14 Claims, 6 Drawing Sheets

(56) References Cited

U.S. PATENT DOCUMENTS

| | | | | |
|---|---|---|---|---|
| 4,898,493 | A * | 2/1990 | Blankenburg | F16B 21/088 |
| | | | | 403/326 |
| 5,661,962 | A * | 9/1997 | Monaco | A01D 42/02 |
| | | | | 56/16.9 |
| 6,955,227 | B1 | 10/2005 | Motosko | |
| 9,010,078 | B2 * | 4/2015 | MacDonald | A01D 34/736 |
| | | | | 30/276 |
| 9,056,381 | B1 | 6/2015 | Airosa | |
| 10,149,433 | B2 | 12/2018 | Wyne | |
| 10,440,881 | B2 | 10/2019 | Jerez et al. | |
| 10,687,476 | B2 | 6/2020 | Gowa | |
| 2002/0029483 | A1 * | 3/2002 | Price | A01D 34/736 |
| | | | | 30/276 |
| 2012/0054981 | A1 * | 3/2012 | Cantrell | A47L 11/4038 |
| | | | | 15/159.1 |
| 2013/0104332 | A1 * | 5/2013 | Belanger | A46B 13/001 |
| | | | | 15/246 |

OTHER PUBLICATIONS

PE2E Translation of WO-2009140748-A1; Pavan, Paulo; Nov. 26, 2009; p. 1-7 (Year: 2009).*

* cited by examiner

CLEANING TOOL FOR STRING TRIMMERS

TECHNICAL FIELD OF THE INVENTION

The present invention relates in general to cleaning tools, and in particular to cleaning tools for scrubbing, stripping, and burnishing indoor and outdoor surfaces, such as floors, walls, baseboards, parking lots, building exteriors, monuments and benches.

BACKGROUND OF THE INVENTION

Cleaning products such as brushes, pads, and cleaning solutions have been developed which may be used for cleaning surfaces such as floors, walls, baseboards, streets, parking lots and parking garages, the outside of buildings, bridge surfaces, and stone and cast concrete structures. Typically, high speed rotary equipment for cleaning such surfaces provides speeds up to about 3,500 rpm and rotary equipment for cleaning at such speeds tends to be heavy and cumbersome to use, as well as costly. Such higher speed rotary equipment is typically handheld and does not lend itself well to cleaning floors, baseboards, parking surfaces. Such equipment places the face of the operator in a less safe position as compared to the new tools. A solution is desirable which is relatively inexpensive, readily available and capable of cleaning floor and ground level surfaces and places the user in a safer standing position away from the action of the tool.

SUMMARY OF THE INVENTION

Novel cleaning tools for use with string trimmers are disclosed which allow users to clean floors, baseboards, and ground level surfaces while comfortably disposed in standing positions and with cleaning surfaces having rotary speeds ranging from 7,000 rpm to 15,000 rpm. The cleaning tools are mounted to rotary spindles of the string trimmers and have a body of a general cylindrical shape. The bodies each have a centerline axis about which a mounting aperture extends, a first stop surface for engaging a lock plate, and a second stop surface for engaging a lock nut with the respective body disposed there-between. The lock plate and the lock nut are threadingly secured to a rotary spindle for frictionally securing the body in fixed position for rotating with the rotary spindle. One or more brush channels extend through one or more sides of the body, with each brush channel having an edge channel and a bristle channel. The edge channels are disposed interiorly within the body of respective ones of the bristle channels. Channel brush inserts are secured in respective ones of the brush channels. Each channel brush insert includes a mounting base and a bristle body. The mounting bases have widths that are larger than the widths of the bristle bodies. The mounting bases are inserted into respective ones of the edge channels and the bristle bodies extends from respective ones of the mounting bases through the bristle channels, from the one or more sides of the body, and exteriorly of the body. The rotary spindle is rotated at desired speeds to rotate the body and move terminal ends of the bristle body of the channel brush insert against a surface for cleaning the surface. In one embodiment, the body has three brush channels formed to extend into a laterally extending sidewall of the body, and the brush channels are axially spaced apart equal distances about the central axis of the body. The edge channels are disposed equal distances from the central axis of the body. In another embodiment, the brush channels are formed to extend into the bottom end surface of the body, and are spaced apart equal distances across the bottom end surface. The mounting bases extend transverse to the axis of rotation of the spindle for the string trimmer. Lock screws are disposed in terminal edges of respective ones of the edge channels for threading securing adjacent to the mounting bases of respective ones of the channel brush inserts and securing the inserts within respective ones of the brush channels on horizontally mounted Channel Brushes. The Vertically mounted brushes do not require a lock screw since the faceplate of the trimmer covers and captures the top side of the channel brushes thus securing the channels completely. Preferably the bodies of the cleaning tools are machined from solid aluminum bar stock or high-density polyethylene (HDPE) with the use of industrial adhesives for an enhanced level of capture.

DESCRIPTION OF THE DRAWINGS

For a more complete understanding of the present invention and the advantages thereof, reference is now made to the following description taken in conjunction with the accompanying Drawings in which FIGS. 1 through 16 show various aspects of several cleaning tools for string trimmers made according to the present invention, as set forth below:

DETAILED DESCRIPTION OF THE INVENTION

Figure 1:
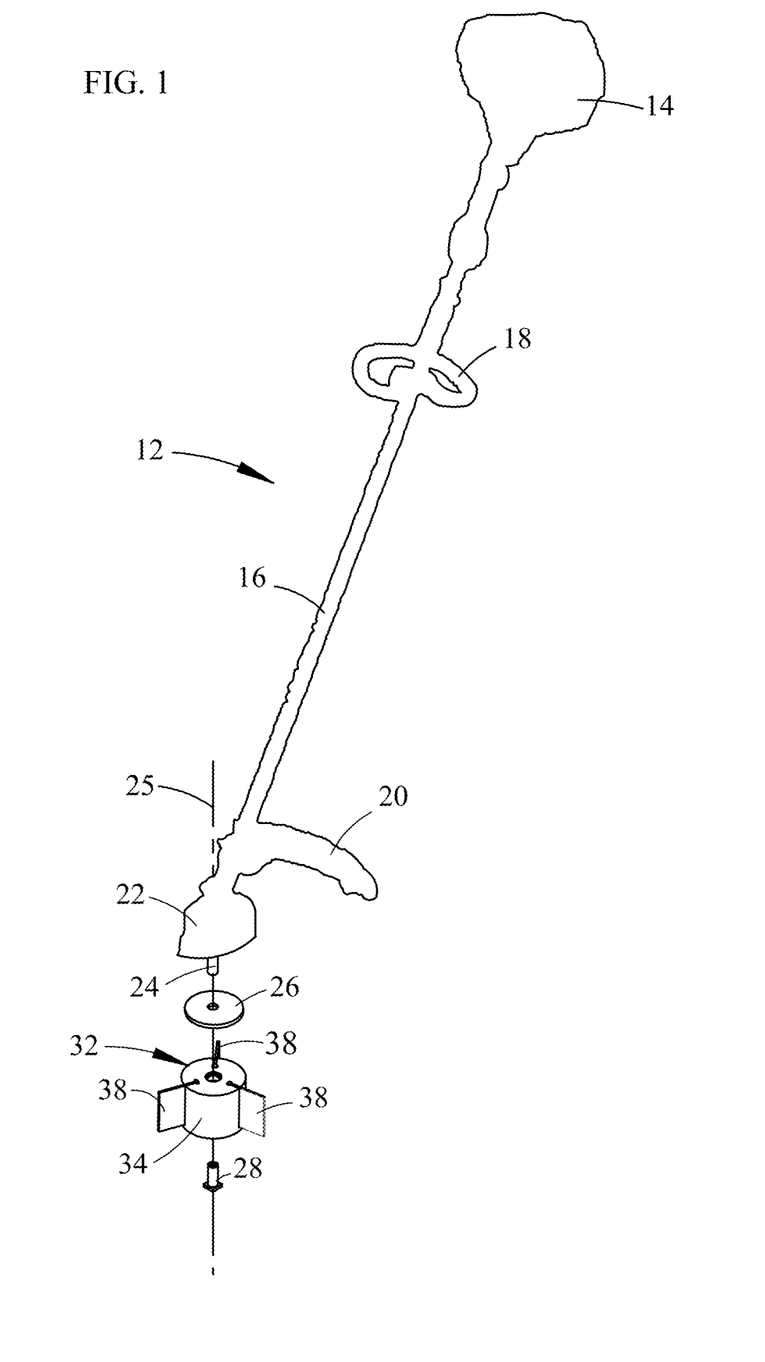
FIG. 1 is a partially exploded, perspective view of a string trimmer and a cleaning tool having laterally extending brushes.

FIG. 1 is a partially exploded, perspective view of a string trimmer 12 and a cleaning tool 32 having laterally extending brushes 38. The string trimmer 12 has a motor housing 14, a shaft 16, a grip handle 18, a guard 20 and a drive head 22. A drive shaft spindle 12 is shown extending beneath the drive head 22 and is connected by a drive shaft extending through the shaft 16 to a drive motor located in motor housing 14 in conventional fashion. Also conventional for string trimmers is a lock plate 26 and a locknut 28 for fixedly securing tools to the drive shaft 24 for rotating relative to the drive head 22 about a rotational axis 25. The nut 18 is preferably provided by a hex-head socket nut. A cleaning tool 32 is shown disposed between the lock plate 26 and locknut 28 for securing to the drive shaft 24. The locknut 28 has internal threads which are screwed onto exterior threads formed on the drive shaft 24. The lock plate 26 also has interior threads which screwed onto the drive shaft 24 and the lock plate 26 is tightened against the top of the cleaning tool 32, with the top of the cleaning tool 32 providing a stop surface for the lock plate 26. This presses the cleaning tool 32 against the locknut which is also threadingly secured to the drive shaft 24. This provides a frictional engagement which secures the lock plate 26, the locknut 28 and the cleaning tools 32 in fixed positions relative to the drive shaft 24.

Figure 2:
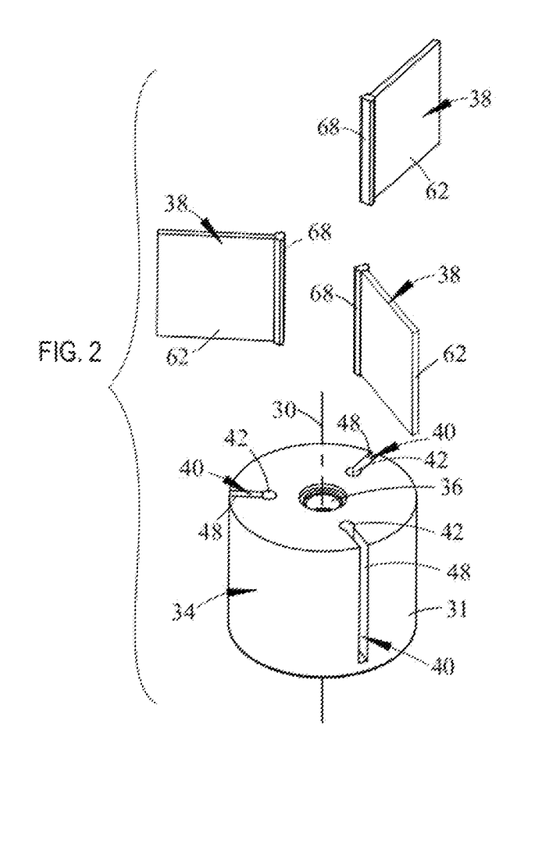
FIG. 2 is an exploded view of the cleaning tool of FIG. 1.

FIG. 2 is an exploded view of the cleaning tool 32 having laterally extending brushes provided by channel brush inserts 38. The channel brush inserts 38 are strip brushes which have a mounting base 68 from which a bristle body 62 extends. The cleaning tool 32 also has a body 34 having a cylindrical shape and a longitudinally extending, central axis 30. The longitudinally extending central axis 30 is coaxially aligned with the rotational axis 25 of the drive shaft 24. The body 34 may be formed of molded materials but preferably is machined of a solid stock material such as aluminum to provide for improved dynamic balancing over molded materials. The body 34 is shown having three slots which define brush channels 40 that extend parallel to the central axis 30 and into the peripheral circumferential edge of the solid body 34. The brush channels 40 have radially inward portions defining edge channels 42 which are sized for receiving and capturing respective ones of the mounting bases 68. The brush channels 40 also have bristle channels 48 which extend from the edge channels 42, radially outward to the peripheral circumferential edge 31 of the body 34. A mounting aperture 36 extends through the center of body 34, coaxial with the central axis 30.

Figure 3:
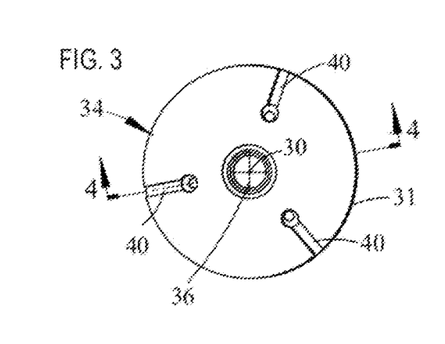
FIG. 3 is a top view of the cleaning tool brush body of FIG. 1.

FIG. 3 is a top view of the body 34 of the cleaning tool 32. The cylindrical shape of the body 34 defines the peripherally and circumferentially extending edge 31, which also extends laterally downward, perpendicular to the plane of the top view. Three brush channels 40 are shown axially spaced equal axial distances around the central axis 30. Three brush channels 40 are shown, but other embodiments may include a lesser number or a larger number of brush channels 40, such as, for example, four of the channels 40 or two of the brush channels 40, spaced equal axial distances around the longitudinally extending central axis 30. In one embodiment two of the brush channels 40 are provided to extend on opposite lateral sides of the body 34. (Not shown).

Figure 4:
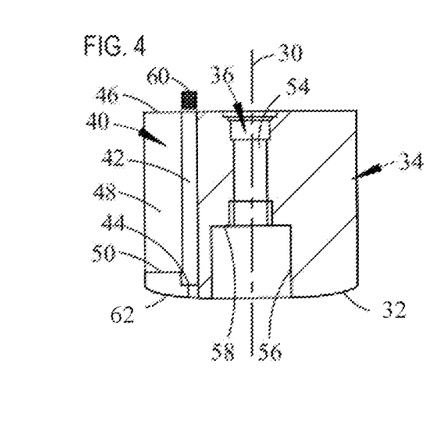
FIG. 4 is a sectional view of the cleaning tool brush body, taken along section line 4-4 of FIG. 3.

FIG. 4 is a sectional view of the body 34 of cleaning tool 32, taken along section line 4-4 of FIG. 3. One of the brush channels 40 is shown having the edge channel 42 for receiving a mounting base 68, and having a bristle channel 38 for passing the bristle body 62. The edge channel 42 has a stop edge 44 defining the lower end for locating the mounting base 68 of the channel brush insert 38 within the edge channel 42. Similarly, the bristle channel 48 has as a stop edge 50 defining the lower end of channel 48 for locating the mounting base 68 of the channel brush insert 38 within the edge channel 42. The brush channels 40 have open tops 46. The upper end of the edge channel 42 may be threaded to have internal threads for threadingly securing a lock screw 60 to retain the channel brush inserts 38 within the brush channels. Preferably the upper portion of the mounting base 68 will be removed to accommodate the lock screw 60. (Not shown). The lock screw 60 may be provided by an Allen head set screw, a headless screw for receiving a hex shaped Allen key. The mounting aperture 36 is shown having a narrow portion 54 for fitting about the drive shaft 24, and an enlarged portion 56 for receiving the body of the locknut 28. The mounting aperture 36, the narrow portion 54 and the enlarged portion 56 are coaxial with central axis 30. A locknut stop 58 is provided for butting the terminal end of the locknut against while the lock plate 26 is butted up against the top terminal end of the body 34. This frictionally engages and non-rotatably secures the body 34 to the drive shaft 24. The upper edges of the channel brush inserts 38 preferably fit flush with the upper surface of the body 34.

Figure 5:
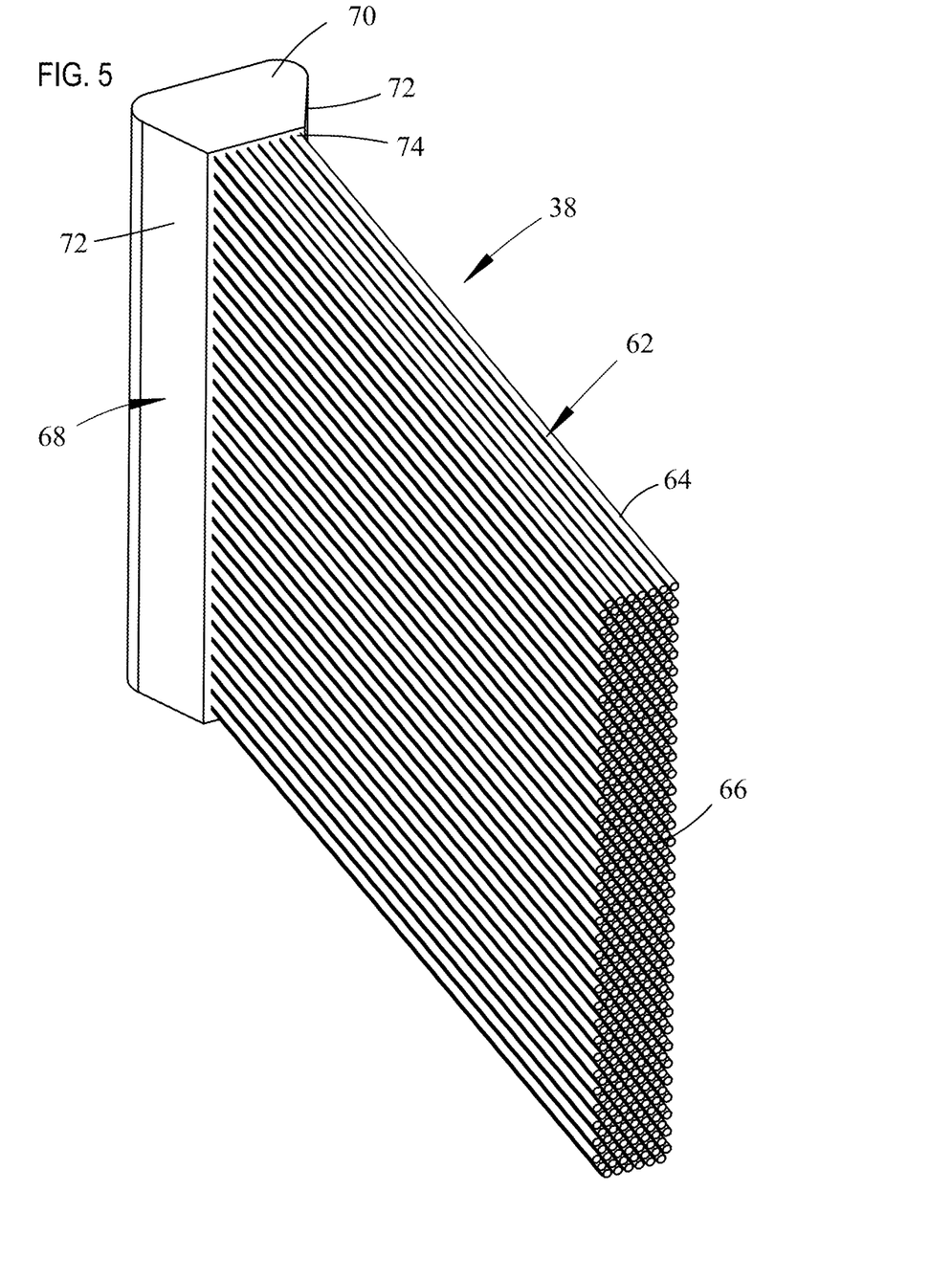
FIG. 5 is a perspective view of a channel brush insert having a bundle of brush bristles.

FIG. 5 is a perspective view of a channel brush insert 38 having a bundle of brush bristles 64 which collectively define a bristle body 62. The channel brush insert 38 is often called a channel brush or a strip brush. The bristles 64 end along a plane to define an outer terminal edge 66 for the bristle body 62. The bristle body 62 has an inward end 74 with an inward terminal edge (not shown) which is disposed within a cavity of the mounting base 68. The mounting base 68 has opposite tapered sides 72 which extend from an outward terminal end 70 of the mounting base 68. The inward end 74 of the bristle body 62 is fixedly secured within the mounting base 68 but either crimping with the tapered sides 72, molding into the mounding base 68, or securing with an adhesive, or a combination thereof.

Figure 6:
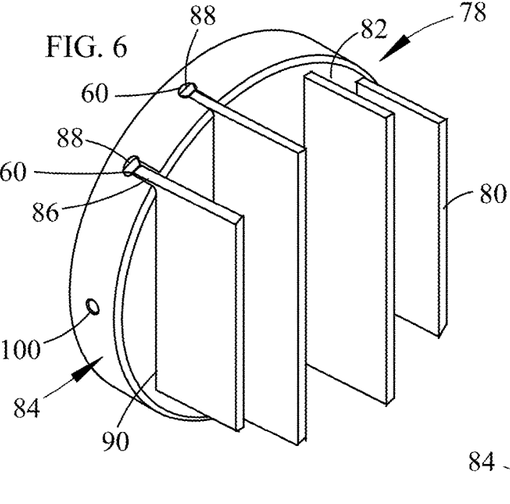
FIG. 6 is a perspective view of a cleaning tool having downwardly extending brushes provided by channel brush inserts.

FIG. 6 is perspective view of a cleaning tool 78 having downwardly extending brushes provided by a plurality of channel brush inserts 80. The channel brush inserts 80 extend downward from the bottom end 82 of a body 84 of the cleaning tool 78. The body 84 is shown with four parallel brush channels 86, providing slots through one lateral side and the bottom end surface 82 for receiving the channel brush inserts 80. More or less than four brush channels 86 may be provided, and in some embodiments the brush channels 86 may not be parallel. The brush channels 86 have edge channels 88 for receiving respective mounting bases 68 and bristle channels 90 for receiving respective bristle bodies 62. The lock screw 60 is shown threadingly secured into a tapped (threaded) portion of the upper end of the edge channels 88.

Figure 7:
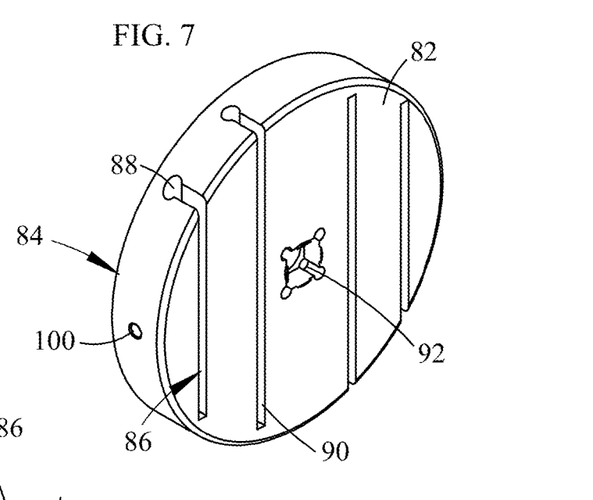
FIG. 7 is a perspective view of the cleaning tool brush body of FIG. 6 with the channel brush inserts removed.
Figure 8:
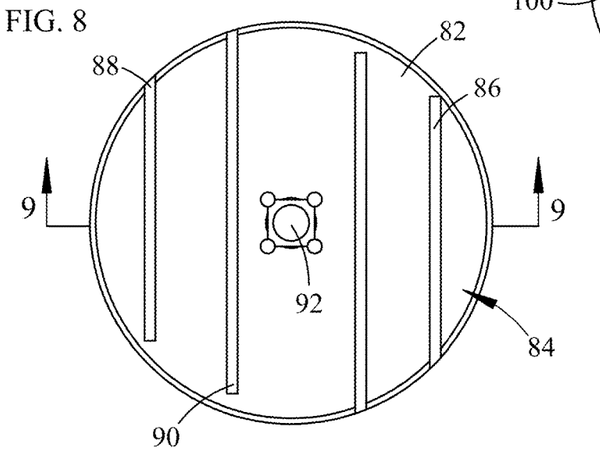
FIG. 8 is a bottom side view of the cleaning brush body of FIG. 7.
Figure 9:
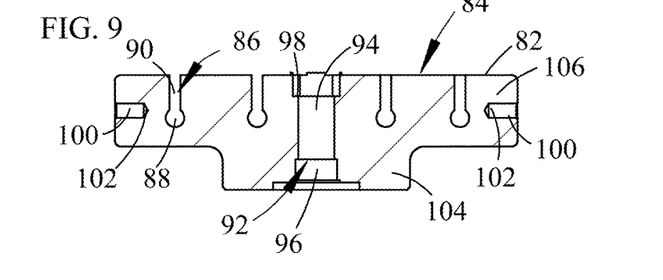
FIG. 9 is a sectional view of the cleaning tool brush body of FIG. 7, taken along section line 9-9 of FIG. 8.

FIG. 7 is a perspective view, FIG. 8 is a bottom side view, and FIG. 9 is a sectional view taken along section line 9-9 of FIG. 8 of the brush body 84 of the cleaning tool 78 of FIG. 6 with the channel brush inserts 80 removed. Two of the brush channels 86 extend into one lateral edge of the body 84 and two of the brush channels 86 extend into a lateral edge on an opposite side of the body 84 from the other two of the brush channels 86 to enhance dynamic balancing of the cleaning tool 78. The brush channels 86 extend through the bottom edge surface 82 of the body 84. The mounting aperture 92 extends through a central portion of the brush body 84, perpendicular to the bottom and the top of the body 84. The mounting aperture 92 has an upper portion 96 for receiving the drive shaft 24, and a lower portion 94 for receiving the locknut 28. The body 84 is shown in an upside-down position in FIG. 9. A locknut stop 98 is provided in the lower portion 94 of the mounting aperture. The sidewalls of the lower portion 94 are preferably configured to provide a square-shaped cross-section for capturing the head of the locknut 28 to prevent rotation of the locknut 28 relative to the body 84. Two lock holes 100 are provided on opposite lateral sides of the body 84 for receiving screw driver tip, such as for a phillips head screw drive. A steel pin or a metal nail may also be inserted into either of the lock holes 100. The lock holes 100 allow for torque to be applied for either rotating or holding the body 84 against rotating as the body 84 is mounted to the drive shaft 24 with the lock plate 26 and the locknut 28 shown in FIG. 1. The body 84 preferably has a head portion 106 with a cylindrical shape having a lower end face from which the channel brush inserts 80 extend, and a boss 104 which is of a cylindrical shape which is of smaller diameter than that of the head portion 106. The boss 104 is mounted to the string trimmer 12 of FIG. 1 such that it is located adjacent to the drive head 22.

Figure 10:
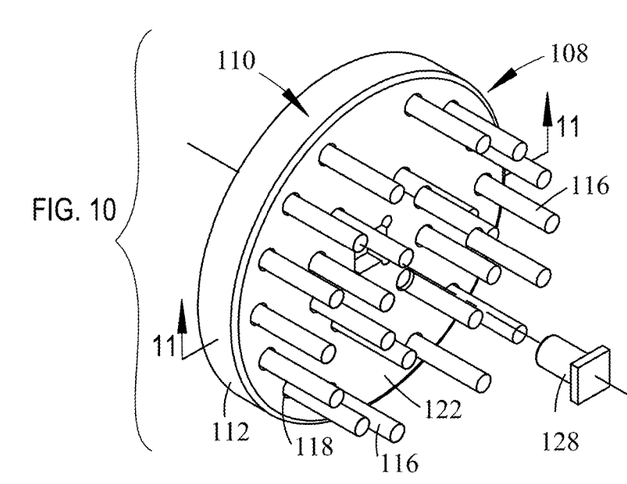
FIG. 10 is a perspective view of a cleaning tool having multiple bristle inserts which are spread across and extend downward from the bottom side of the cleaning tool brush body.

FIG. 10 is a perspective view of a cleaning tool 108 having a body 110 having a cylindrically shaped brush head 112. Bristle inserts 116 are mounted into the lower face of the brush head 112, and are preferably either provided by solid molded single bristles or by a tufted collection of bristles formed of synthetic or natural fibers. The bristle inserts 116 are secured within mounting holes 118. The brush head 112 preferably has a flat bottom surface 122 from which the working end of the bristle inserts 116 extend.

Figure 11:
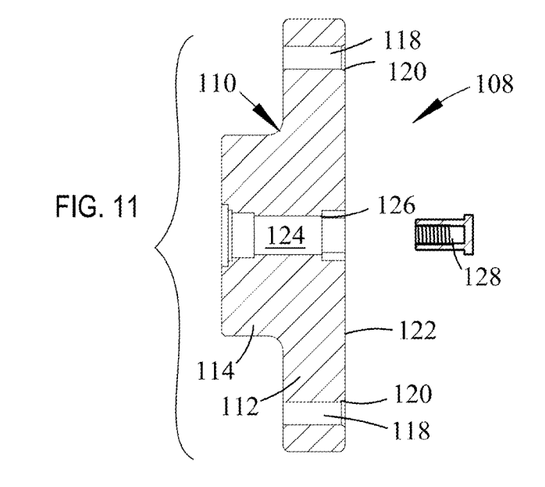
FIG. 11 is a sectional view of the cleaning tool having multiple bristle inserts taken along section line 11-11 of FIG. 10.

FIG. 11 is a sectional view of the body 110 of the cleaning tool 108, taken along section line 11-11 of FIG. 10. The body 110 has the cylindrically shaped brush head 112 and a cylindrically shaped mounting boss 114 disposed adjacent the brush head 112, preferably with the mounting boss 114 disposed above the brush head 112. The mounting holes 118 for the bristle inserts 116 have tapered entrance ends 120 to facilitate insertion of the bristle inserts 116 and to extend wear life by reducing potential stress concentrations of the brush head 112 from engaging the base portions of the bristle inserts 116. A mounting aperture 124 is provided and has a locknut stop 126 and a rectangular shaped cross section on the lower terminal end portion of the mounting aperture 124 for capturing a square shaped head of the locknut 128. The locknut 128 is preferably provided by a square-head socket nut. The rectangular shaped cross section on the lower terminal end portion of the mounting aperture 124 is countersunk so that the head of the locknut 128 will be disposed above the plane of the bottom surface 122 and will not engage a surface which is being cleaned.

Figure 12:
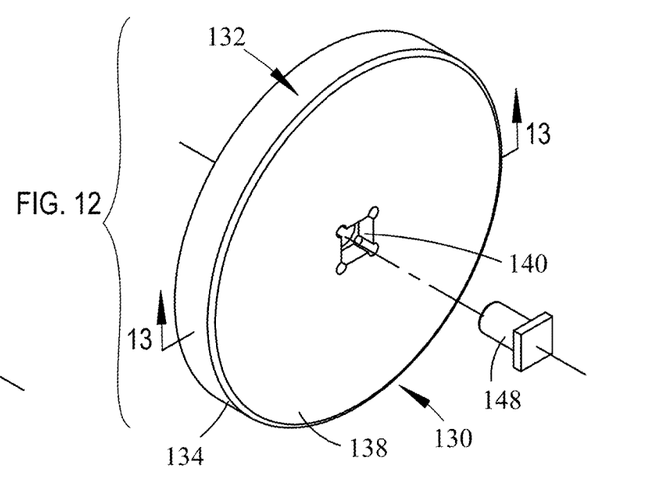
FIG. 12 is a perspective view of a cleaning tool having a flat bottom side for mounting buffing pads and grinding sheets.
Figure 13:
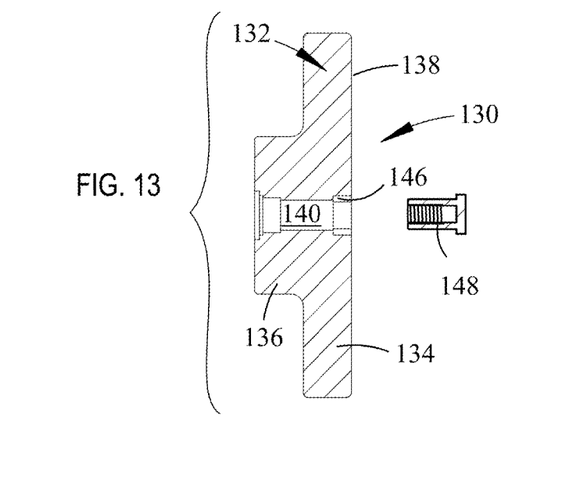
FIG. 13 is a sectional view of the cleaning tool having a flat bottom side taken along section line 13-13 of FIG. 12.

FIG. 12 is a perspective view of a cleaning tool 130 having a flat bottom surface 138 for mounting buffing pads and grinding sheets, and FIG. 13 is a sectional view of the cleaning tool 130, taken along section line 13-13 of FIG. 12. The body 132 has the cylindrically shaped head 134 and a cylindrically shaped mounting boss 136 disposed adjacent the brush head 134, preferably with the mounting boss 136 disposed above the brush head 134. A mounting aperture 140 is provided and has a locknut stop 146 and a rectangular shaped cross section on the lower terminal end portion of the mounting aperture 140 for capturing the square shaped head of the locknut 148. The locknut 148 is preferably provided by a square-headed socket nut. The rectangular shaped cross section on the lower terminal end portion of the mounting aperture 140 is countersunk so that the head of the locknut 148 will be disposed above the plane of the flat bottom surface 138 and will not engage a surface which is being cleaned.

Figures 14, 15, 16:
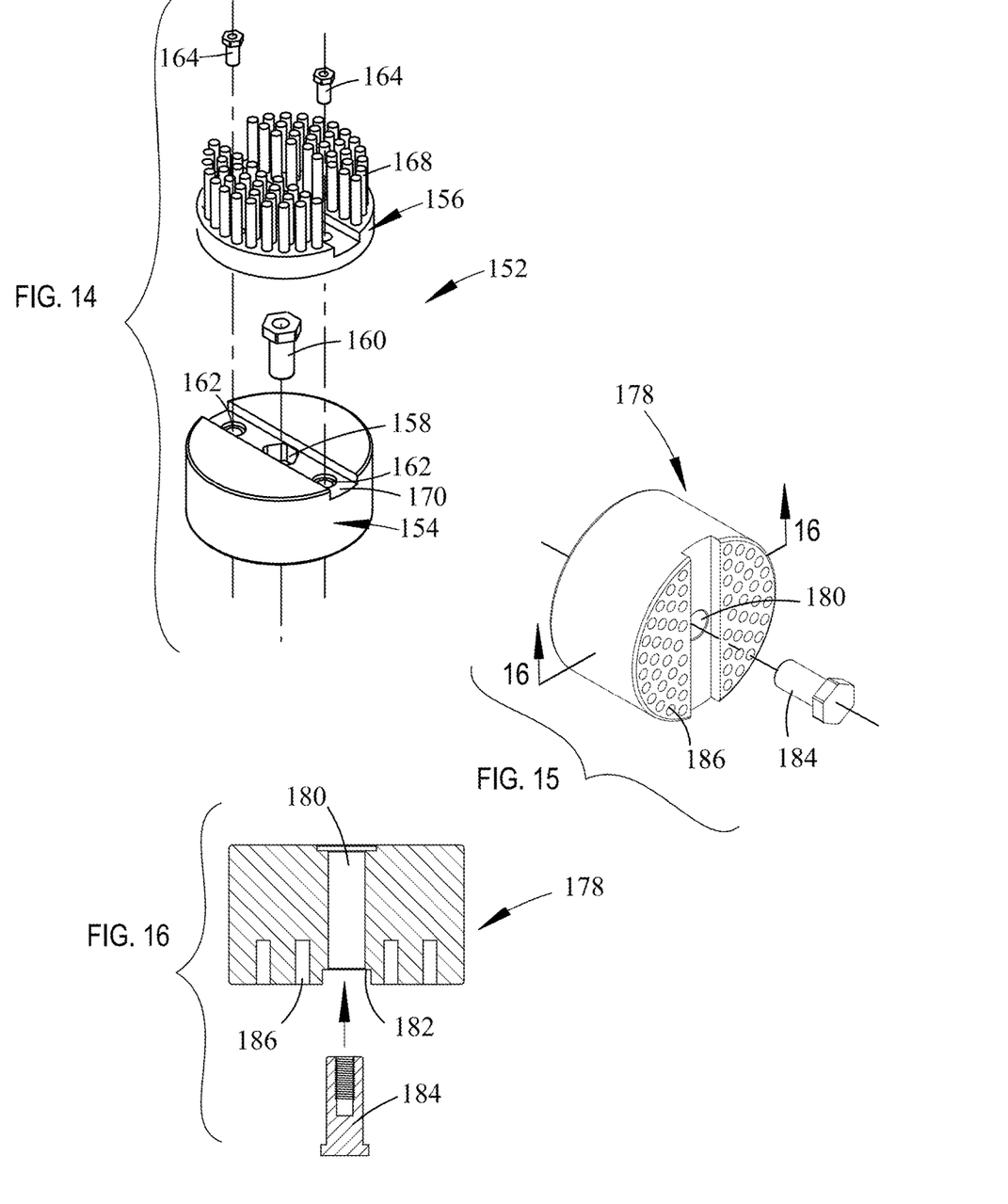
FIG. 14 is an exploded perspective view of a cleaning tool having two parts, one being a head for mounting to the drive shaft of the string trimmer and the other being a removable brush having bristle inserts.
FIG. 15 is an exploded perspective view of a cleaning tool body and locknut.
FIG. 16 is a sectional view of the cleaning tool body and locknut taken along section line 16-16 of FIG. 15.

FIG. 14 is an exploded perspective view of a cleaning tool 152 having two parts, one being a mounting boss 154 for mounting to the drive shaft 24 of the string trimmer 12 and the other being a removable brush head 156 having bristle inserts 168 mounted therein. The cleaning tool 152 is shown in an upside-down position in FIG. 14, looking downward onto the cleaning tool 152. The bristle inserts 168 are preferably provided by either solid molded single bristles, or by a tufted collection of bristles formed of synthetic or natural fibers. A locknut 160 is preferably provided by a hex-head socket nut. The locknut 160 secures the mounting boss 154 to drive shaft 24 with frictional locking forces provided by a backup retention of the locking plate 26 being threadingly secured to a portion of drive shaft 24 located above the lower portion of the drive shaft 24 to which the locknut 162 is threadingly secured. A mounting aperture 158 extends longitudinally through the center of the mounting boss 154. The mounting aperture 158 has an interior profile with a cross-section on the lowermost end which is hexagonally shaped for capturing a hexagonal shaped head of the locknut 160 to prevent rotation between the head of the locknut 160 and the mounting boss 154. The mounting aperture 158 preferably has an interior profile similar to that shown for mounting aperture 180 to provide an annular-shaped flat similar to that of the locknut flat 182 for the locknut 160 to butt-up against when tightened onto the drive shaft 24. Two brush mounting apertures 162 are disposed on opposite sides of the mounting aperture 158. The lowermost terminal ends of the mounting apertures 158 and 162 extend into a channel 170 which provides a recess from the lowermost surface of the mounting boss 152 and the lowermost terminal ends of the mounting boss 154 so that head of the locknut 160 will not interfere with mounting of the brush head 156 thereto. The brush head 156 is secured to the mounting boss 154 by means of the two threaded bolt type fasteners 164 which preferably have exterior threads for threadingly securing to the tapped, or interiorly threaded, ends of the mounting apertures 162 formed into the mounting boss 154.

FIG. 15 is an exploded perspective view and FIG. 16 is a sectional view, taken along section line 16-16 of FIG. 15, of a cleaning tool body 178 and locknut 184. The cleaning tool body 178 has mounting aperture 180 for receiving the locknut 184 and capturing the head of the locknut 184. The locknut is preferably a socket type nut with a hex head for threadingly securing to the end of the drive shaft 24. Apertures 186 are provided for mounting bristles which are either solid or formed of tufted fibers.

In operation various ones of the above cleaning tools are secured to the drive shaft spindle of a string trimmer. The cleaning tool 32 of FIGS. 1-4 may be used for cleaning baseboards and the like. The cleaning tool 78 of FIGS. 6-9 may be used for cleaning and polishing floors. The cleaning tool 108 of FIGS. 10-11 may also be used for cleaning and polishing floors. The cleaning tool 130 of FIGS. 12 and 13 will accept cleaning and polishing pads for fitting over the flat surface 138, and will also accept abrasive pads and other materials for mounting to the surface 138 for grinding surfaces. The cleaning tool 152 of FIG. 14 and the cleaning tool body 178 may similarly be mounted to a string trimmer for cleaning and polishing various surfaces according to the present disclosure.

The present invention provides advantages of various cleaning tools for use with string trimmers. Conventional buffing and polishing pads typically operate at speeds up to 1200 rpm to 3200 rpm (revolutions per minute). With string trimmers burnishing may be accomplished with rotational speeds ranging from 7,000 rpm to 15,000 rpm by coupling to a spindle of a string trimmer a cleaning tool made according to the present disclosure.

Although the preferred embodiment has been described in detail, it should be understood that various changes, substitutions and alterations can be made therein without departing from the spirit and scope of the invention as defined by the appended claims.

What is claimed is:

1. A cleaning tool for mounting to a rotary spindle of a string trimmer comprising:
    a body having a centrally disposed mounting aperture extending along a centerline axis of the body, the body having a first stop surface for engaging a lock plate and a second stop surface for engaging a lock nut with the body disposed there-between;
    the lock plate and the lock nut being threadingly secured to the rotary spindle of the string trimmer and frictionally securing the body in a fixed position for rotating with the rotary spindle;
    the body having one or more brush channels extending parallel to the centerline axis through one or more sides of the body, wherein the one or more brush channels each include an edge channel and a bristle channel, with each of the edge channels disposed interiorly within the body of a respective one of the bristle channels for receiving a respective channel brush insert;
    the channel brush inserts each including a mounting base and a bristle body having laterally extending bristles that end along a plane to define an outer terminal edge of the bristle body and having an inward end with an inward terminal edge disposed within a cavity of the mounting base, wherein the mounting base has a larger width than a width of the bristle body, and the mounting base is inserted into one of the edge channels and the bristle body extends from a respective one of the mounting bases through one of the bristle channels, from the one or more sides of the body, and exteriorly of the body;
    and wherein the rotary spindle is rotated at desired speeds to rotate the body and move terminal ends of the outer terminal edge of the bristle body of the channel brush insert against a surface horizontally outward from the bristle body for cleaning and polishing the surface, the surface comprising one of a baseboard and a floor.

2. The cleaning tool for mounting to rotary spindles of string trimmers according to claim 1, further comprising the brush body having three brush channels axially spaced apart equal distances about the centerline axis of the body, and wherein the edge channels are disposed equal distances from the centerline axis of the body.

3. The cleaning tool for mounting to rotary spindles of string trimmers according to claim 2, further comprising lock screws disposed in terminal edges end of the edge channel for threadingly securing the mounting bases of respective ones of the channel brush inserts and securing the channel brush inserts within respective ones of the brush channels of the body.

4. The cleaning tool for mounting to rotary spindles of string trimmers according to claim 1, further comprising each of the bristle bodies of the channel brush inserts comprising a plurality of individual bristles secured in a respective mounting base.

5. The cleaning tool for mounting to rotary spindles of string trimmers according to claim 1, further comprising the body having a lowermost end with rounded edges along an exterior of a bottom surface of the body.

6. The cleaning tool for mounting to rotary spindles of string trimmers according to claim 1, further comprising the body being machined from a solid stock of aluminum.

7. The cleaning tool for mounting to rotary spindles of string trimmers according to claim 1, further comprising the mounting aperture having a narrow portion for receiving the rotary spindle and an enlarged portion for receiving the lock nut, wherein the second stop surface for engaging with the lock nut is annular-shaped and defined between the narrow portion and the enlarged portion of the mounting aperture.

8. A cleaning tool for mounting to a rotary spindle of a string trimmer comprising:
    a body having a generally cylindrical shape and a centrally disposed mounting aperture extending along a centerline axis of the body, the body having a first stop surface for engaging a lock plate and a second stop surface for engaging a lock nut with the body disposed there-between;
    the lock plate and the lock nut being threadingly secured to the rotary spindle of the string trimmer for securing the body in a fixed position for rotating with the rotary spindle;
    the body having a lateral sidewall with one or more brush channels extending parallel to the centerline axis through the lateral sidewall of the body, wherein the one or more brush channels each include an edge channel and a bristle channel, with each of the edge channels disposed interiorly within the body of a respective one of the bristle channels for receiving a respective channel brush insert;
    the channel brush inserts each including a mounting base and a bristle body having laterally extending bristles that end along a plane to define an outer terminal edge of the bristle body and having an inward end with an inward terminal edge disposed within a cavity of the mounting base, wherein the mounting base has a larger width than a width of said bristle body, and the mounting base is inserted into one of the edge channels and the bristle body extends from a respective one of the mounting bases through one of the bristle channels, from the lateral sidewall of the body, and exteriorly of the body; and
    wherein the rotary spindle is rotated at desired speeds to rotate the body and move terminal ends of the outer terminal edge of the bristle body of the channel brush insert against a surface horizontally outward from the bristle body for cleaning and polishing the surface, the surface comprising one of a baseboard and a floor.

9. The cleaning tool for mounting to rotary spindles of string trimmers according to claim 8, further comprising the brush body having three brush channels axially spaced apart equal distances about the centerline axis of the body, and wherein the edge channels are disposed equal distances from the centerline axis of the body.

10. The cleaning tool for mounting to rotary spindles of string trimmers according to claim 9, further comprising lock screws disposed in terminal edges end of the edge channel for threadingly securing the mounting bases of respective ones of the channel brush inserts and securing the channel brush inserts within respective ones of the brush channels of the body.

11. The cleaning tool for mounting to rotary spindles of string trimmers according to claim 8, further comprising each of the bristle bodies of the channel brush inserts comprising a plurality of individual bristles secured in a respective mounting base and extending through the lateral sidewall of the body.

12. The cleaning tool for mounting to rotary spindles of string trimmers according to claim 8, further comprising the body having a lowermost end with rounded edges along an exterior of a bottom surface of the body.

13. The cleaning tool for mounting to rotary spindles of string trimmers according to claim 8, further comprising the body being machined from a solid stock of aluminum.

14. The cleaning tool for mounting to rotary spindles of string trimmers according to claim 8, further comprising the mounting aperture having a narrow portion for receiving the rotary spindle and an enlarged portion for receiving the lock nut, wherein the second stop surface for engaging with the lock nut is annular-shaped and defined between the narrow portion and the enlarged portion of the mounting aperture.

\* \* \* \* \*